United States Patent
Hunt et al.

(10) Patent No.: US 7,085,303 B2
(45) Date of Patent: Aug. 1, 2006

(54) LASER WITH COMBINED LENS AND BIREFRINGENCE COMPENSATOR

(75) Inventors: Jeffrey H. Hunt, Chatsworth, CA (US); Vytas T. Gylys, Bell Canyon, CA (US); Bruce Cameron, Simi Valley, CA (US)

(73) Assignee: The Boeing Company, Chicago, IL (US)

( * ) Notice: Subject to any disclaimer, the term of this patent is extended or adjusted under 35 U.S.C. 154(b) by 312 days.

(21) Appl. No.: 10/688,242

(22) Filed: Oct. 16, 2003

(65) Prior Publication Data

US 2005/0083987 A1 Apr. 21, 2005

(51) Int. Cl.
*H01S 3/08* (2006.01)
(52) U.S. Cl. .................................... 372/101; 372/105
(58) Field of Classification Search ................ 372/101, 372/105
See application file for complete search history.

(56) References Cited

U.S. PATENT DOCUMENTS

| | | | | | |
|---|---|---|---|---|---|
| 3,643,178 | A | * | 2/1972 | Marshall | 372/24 |
| 4,461,009 | A | * | 7/1984 | Lundstrom | 372/108 |
| 6,339,605 | B1 | | 1/2002 | Vetrovec | |
| 6,587,497 | B1 | | 7/2003 | Libby et al. | |
| 2002/0097769 | A1 | * | 7/2002 | Vetrovec | 372/75 |
| 2002/0110164 | A1 | * | 8/2002 | Vetrovec | 372/36 |
| 2002/0172253 | A1 | * | 11/2002 | Vetrovec | 372/95 |
| 2003/0019757 | A1 | * | 1/2003 | Vetrovec | 205/466 |
| 2003/0086466 | A1 | * | 5/2003 | Cox et al. | 372/93 |
| 2003/0227957 | A1 | * | 12/2003 | Pang | 372/59 |

FOREIGN PATENT DOCUMENTS

WO  WO 81/02224  *  8/1981

OTHER PUBLICATIONS

John Vetrovec, Andrea Koumvakalis, Rashmi Shah, Tom Endo, Development of Solid-State Disk Laser for High-Average Power, Lasers & Electro-Optics Systems, The Boeing Company, Canoga Park, CA, Jan. 26-31, 2003, p. 1-11.

John Vetrovec, Andrea Koumvakalis, Rashmi Shah, Solid-State Disk Laser for High-Average Power, Lasers & Electro-Optics Systems, The Boeing company, Canoga Park, CA, Aug. 26-30, 2002, p. 1-4.

John Vetrovec, Ultrahigh-Average Power Solid-State Laser, The Boeing Company, Canoga Park, CA Apr. 22-26, 2002, pg. p. 1-15.

(Continued)

*Primary Examiner*—James Menefee
(74) *Attorney, Agent, or Firm*—Ingrassia Fisher & Lorenz, P.C.

(57) ABSTRACT

A laser includes a chamber having a front mirror and a back mirror defining a optical propagation path. An optical gain medium such as a solid state disk, rod or slab is located between the front and back mirrors within the chamber to produce a laser light along the optical propagation path. A birefringent lens formed from an optically active material is located within the chamber to simultaneously focus the laser light and to affect the polarity of the laser light as the light passes through the birefringent lens.

25 Claims, 3 Drawing Sheets

OTHER PUBLICATIONS

John Vetrovec, Company Active Mirror. Laser (CAMIL), The Boeing Company, Canoga Park, CA Jan. 22-26, 2001, p. 1-12.

Lens Problems Scupper 157nm. Optics.org [online]. Retrieved from Internet Oct. 2, 2003: <URL: www.optics.org/articles/ole/8/9/5/1>.

* cited by examiner

LASER WITH COMBINED LENS AND BIREFRINGENCE COMPENSATOR

TECHNICAL FIELD

The present invention generally relates to lasers, and more particularly relates to lasers having a combined lens and birefringence compensator.

BACKGROUND

The use of laser-generated electromagnetic optical energy has become ubiquitous in applications ranging in areas from commercial to national defense. An illustrative example of the former is the use of optical energy for industrial materials processing, including cutting, welding and surface treatment. End products resulting from such implementations come from such wide ranging business areas as automotive, aerospace, appliance and shipbuilding. More exotic applications can include rock drilling for mining and/or oil and gas exploration purposes. Directed energy or so-called "laser weapons" are finding increased acceptance in the defense community because of the position-sensitive lethality delivery. As lasers become smaller, more efficient and robust, it is easier to integrate them into ground-based, sea-based, airborne and space-borne paradigms.

Solid-state lasers (SSLs), in particular, have received renewed attention in recent years, especially in high average power (HAP) applications, where large energy delivery allows for implementation in military and/or industrial uses. Such lasers include a solid-state host material in either crystal or glass form that is doped with suitable rare-earth ions. These ions are optically pumped with light generated by another optical source, such as a semiconductor diode or high intensity flashlamp. After absorption of the pumping light, the ions re-emit the light into the optical resonator, creating a coherent light or laser output. Various types of SSLs used in HAP applications have lasing media formed in disk, rod, slab (i.e. "zigzag") or other shapes, depending on the pumping mechanism and whether the output is designed to optimize output power, efficiency or beam propagation characteristics.

Although SSLs are effective for many purposes, they frequently present design challenges due to waste heat deposited into the gain medium by the optical pumping. The frequency of optical pumping light is higher than the output laser frequency. The difference in these frequencies represents electronic energy, which is coupled into phonon excitations in rare earth ion host materials and eventually couples to the thermal excitation in the solid, this being loosely characterized as waste heat. This heat can cause various types of thermo-mechanical and thermo-optical distortions in the laser, resulting in nonuniformities in the refractive properties of the gain medium. These fluctuations manifest themselves in macroscopic optical degradations, such as thermal lensing, mechanical stresses, depolarization and other undesirable effects. These effects could result in degradation in beam quality (BQ), reduced laser power and/or possible fracture of the SSL lasing medium. Other types of lasers are similarly responsive to thermo-mechanical distortions such as thermal lensing and/or depolarization.

Many SSLs and other lasers include one or more optical lenses to focus light emanating from the gain medium, to compensate for thermal lensing and for other purposes. To compensate for thermal lensing, refractive elements or non-infinite radii of curvature reflective surfaces will be included internally to the optical resonator. Lasers also frequently include one or more birefringence compensators such as a Faraday rotator to suppress unwanted modes propagating in the laser, to reduce the effects of thermal depolarization and thermally induced birefringence, and the like. Birefringence compensators will typically be composed of uniaxial or biaxial crystals with so-called optical activity. Optical activity is a material property in which the refractive index experienced by an electromagnetic beam is dependent on the polarization of the beam relative to an optical axis within the crystal structure. While the addition of lenses and birefringence compensators provides quantitative improvement in the laser performance, these elements unfortunately increase the mechanical complexity of the laser, and may lead to design difficulties due to the increased optical and mechanical instability of additional elements within the optical propagation path of the laser. More particularly, the additional optical elements makes the laser more susceptible to mechanical vibrations and subsequent mis-alignments, thereby increasing maintenance costs and/or degrading laser performance. The additional elements may also add undesirable weight and volume to the laser, further complicating opto-mechanical design.

It is therefore desirable to reduce the weight, volume and complexity of the laser by reducing the number of components, particularly within the optical propagation path of the laser. It is also desirable to create a laser with reduced complexity that is capable of high average power applications. Other desirable features and characteristics will become apparent from the subsequent detailed description and the appended claims, taken in conjunction with the accompanying drawings and this background discussion.

BRIEF SUMMARY

According to various exemplary embodiments, a laser is provided with a single optical element that acts as both a lens and as a birefringence compensator. An exemplary laser suitably includes a chamber having a front mirror and a back mirror defining an optical propagation path. An optical gain medium such as a solid state disk, rod or slab is located between the front and back mirrors within the chamber to produce a laser light along the optical propagation path. A birefringent lens formed from an optically active material is located within the chamber to simultaneously focus or defocus the laser light and to affect the polarization of the light as it passes through the birefringent lens. The optically active material may include quartz or calcite, for example, or another material with a suitable lattice structure for affecting the polarization of light passing through the material.

BRIEF DESCRIPTION OF THE DRAWINGS

The present invention will hereinafter be described in conjunction with the following drawing FIGS., wherein like numerals denote like elements.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

According to various exemplary embodiments, a laser resonator includes a lens formed from optically-active material to simultaneously focus the laser beam and compensate for any parasitic birefringence. By combining the functions of a lens and a birefringence compensator into a single optical element, the optical and mechanical complexity of the laser is reduced, thereby providing benefits of increased optical and mechanical stability. Weight and volume of the laser may also be reduced by replacing multiple elements with a single optical compensator, thereby improving the overall design of the laser, particularly for space and other noncompliant optical environment applications.

Although the invention is frequently described herein as pertaining to solid-state lasers, the concepts and structures described herein may be readily adapted to a wide variety of equivalent environments. Birefringent lenses may be incorporated into any type of laser, for example, including chemical lasers, dye lasers, excimer lasers, ion lasers and/or the like. Various lasers as described herein may be used to construct laser oscillators as well as laser amplifiers operating in a pulsed (i.e. storage) mode, continuous wave (CW) mode, long pulse (quasi-CW) mode and/or the like. Similarly, the spatial and mechanical layouts of the various components may vary widely from the exemplary embodiments described herein. The birefringent lens may be located at any point along the optical propagation path within the resonator, for example, and indeed any number of birefringent lenses may be incorporated into different types of lasers and/or laser systems in a wide array of alternate but equivalent embodiments that may be used in any military, industrial, commercial, research or other setting.

The term "substantially" as used herein is intended to encompass certain deviations from the exact descriptions set forth. Such deviations may be the result of environmental effects, manufacturing imperfections, design choices and/or other factors. In the case of spatial dimensions or shapes, for example, "substantial" equivalence would include variations (e.g. on the order of 15% or more) from the exact terms or limits specified without deviation from the general concepts set forth herein.

Figure 1:
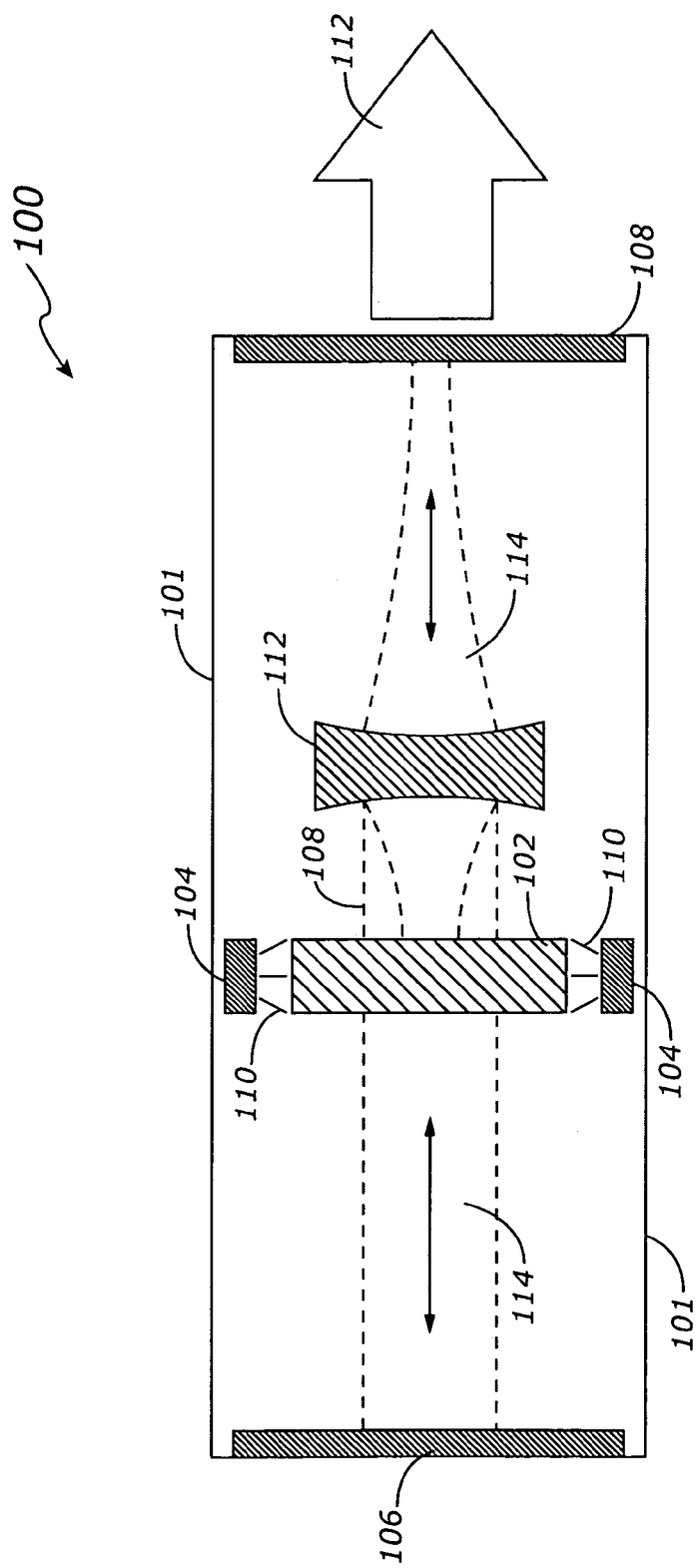
FIG. 1 is a block diagram of an exemplary laser resonator with an integrated birefringent lens.

Turning now to the drawings and with initial reference to FIG. 1, an exemplary laser 100 producing a laser beam 112 suitably includes a gain medium 102, a birefringent lens 112 and two or more mirrors 106, 108 defining a optical propagation path 114 within the resonator chamber 101. Lens 112 appropriately adjusts the polarity of laser light produced by gain medium 102 as the light propagates on optical propagation path 114, thereby providing both focusing and birefringence compensation in a single component.

Resonator chamber 101 is any chamber, laser cavity, housing or other enclosure capable of mechanically supporting the various components of laser 100 and of protecting the optical components from any environmental effects such as dust, moisture, radiation, vibrations and/or the like. In various embodiments, chamber 101 is formed from a suitable material that is relatively tolerant of heat produced by laser 100, and that is capable of maintaining the optical components (e.g. gain medium 102 and lens 112) in a relatively rigid position during operation such as aluminum, titanium or other metals. Alternate embodiments of chamber 101 are formed of plastic, ceramic, carbon composites, or other appropriate materials. Although FIG. 1 shows housing 101 as entirely enclosing optical components 102 and 112, alternate embodiments may include windows or other openings that allow access to the various interior components. Similarly, alternate embodiments of housing 101 may differ radically from the generally rectangular shape shown in FIG. 1 to include any number of angled, curved and/or straight interior or exterior surfaces.

Resonator chamber 101 houses an appropriate optical propagation path 114 for laser light produced by gain medium 102. Optical propagation path 114 is suitably bounded and defined by two or more mirrors 106, 108 at each end of chamber 101. Alternatively, additional mirrors may be provided and/or the positioning of the various mirrors may be altered to alter the shape of optical propagation path 114 as appropriate. Each of the mirrors 106, 108 is formed of glass, plastic or another suitable material and is made reflective through the use of reflective coatings or the like. Exemplary coating materials include chrome, silver and other highly reflective materials, although other materials could be used in alternate embodiments. In the exemplary embodiment shown in FIG. 1, back mirror 106 is fashioned to be highly reflective (e.g. ideally 100%) to maximize the efficiency of laser 100. Similarly, front mirror 108 is fashioned to be at least partially transmissive (e.g. on the order of about 80% reflective, 20% transmissive, although this proportion may vary significantly from embodiment to embodiment) to permit some portion of the laser light on path 114 to escape chamber 101, thereby forming laser beam 112. Mirrors 106, 108 are appropriately selected and positioned to create resonant light on path 114. Although FIG. 1 shows a linear standing wave cavity having two mirrors, other incarnations are possible. Ring cavities, for example, may contain three or more mirrors to create an appropriate optical propagation path 114.

Gain medium 102 is any light source or amplifier capable of producing light though stimulated photon emission. Typically, gain medium 102 includes a laser gain material capable of amplifying a laser beam in response to optical pump radiation 110 received from one or more pump light sources 104. The laser gain material may be, for example, an optical material having a host lattice doped with suitable ions that are capable of being pumped to laser transition. Examples of host lattice materials include yttrium aluminum garnet (YAG), gadolinium gallium garnet (GGG), gadolinium scandium gallium garnet (GSGG), yttrium lithium fluoride (YLF), yttrium vanadate, phosphate laser glass, silicate laser glass, sapphire, and the like. Exemplary dopants for the lasing medium include tin, copper, cobalt, nickel, chromium, cesium, praseodymium, neodymium, samarium, europium, gadolinium, terbium, dysprosium, holmium, erbium, thulium and/or ytterbium, although other materials could be used in alternative embodiments. Common solid state lasers include YAG lasers doped with ytterbium (Yt:YAG), neodymium (Nd:YAG), or other Lanthanoid elements.

As briefly mentioned above, "solid state" lasers typically incorporate a gain medium 102 formed into a disk, rod, slab or the like. Particular dimensions and shape of gain medium 102 may vary widely from embodiment to embodiment, but in an exemplary embodiment, gain medium 102 is approximately shaped like a round disk with a thickness on the order of about 1–10 mm and a diameter of about 10–300 mm, with the transverse dimension typically being at least several times greater than the thickness of the disk. In alternate embodiments, gain medium 102 may be formed in other shapes such as polygonal, circular, elliptical, or other shape defined by any combination of linear and/or curved segments. Accordingly, the gain medium 102 described herein is intended to broadly encompass any range of equivalent structures without regard to shape, size or composition. Although not shown in FIG. 1, gain medium 102 may be mounted on a substrate or other structure that typically includes a heat exchanger and/or various microchannels for providing cooling material to the heat exchanger. An example of a solid state disk laser is described in commonly-assigned U.S. Pat. No. 6,339,605, although the principles and structures described herein could be used in conjunction with any type of laser.

Any number of optical pump sources 104 may be positioned about the perimeter of gain medium 102, or in any other suitable location for providing pump radiation 110 to gain medium 102. Pump sources 104 may be implemented with any commercially-available diode bars, light emitting diodes (LEDs) or other sources capable of providing pump light of the appropriate wavelength to produce stimulated light emissions in the particular gain medium 102. In a Nd:YAG laser, for example, pump radiation 110 with a wavelength of approximately 910 nm is provided to gain medium 102 to produce laser light with a wavelength of approximately 1060 nm on optical propagation path 114.

Laser light on path 114 is appropriately focused and/or polarization adjusted by birefringent lens 112. Normally, when an optical beam propagates through a medium, the polarization is unaffected. A material which exhibits birefringent behavior will be characterized by the possession of an optical axis, also referred to as the fast axis or z-axis. This axis combined with the propagation direction of the beam defines a plane known as the plane of propagation. A beam with its polarization in the plane of propagation will experience one value of refractive index, while a beam with polarization perpendicular will experience a different value of refractive index. As can be seen, if a beam has both perpendicular and parallel components, a phase difference will be created between the two components, causing changes in polarization characteristics of the beam. This phase difference can range from zero to $2\pi$ radians. Birefringent lens 112 is therefore any optically transmissive material capable of being formed into a converging or diverging lens while affecting the polarization of light passing through the lens. The amount of polarization compensation provided by birefringent lens 112 is appropriately determined by the material composition, orientation and thickness of lens 112. Examples of suitable materials for birefringent lens 112 include calcite, quartz, tourmaline, sodium nitrate or any other materials with differing indices of refraction associated with various crystallographic directions. The birefringence designed into lens 112 is appropriately designed to correct for polarization errors resulting from thermo-mechanical distortions and/or to correct the polarization of certain modes propagating in the laser resonator (i.e. along optical propagation path 114). By designing lens 112 of an appropriate thickness, polarization shifts from zero to $2\pi$ radians may be induced into optical propagation path 114. Additional detail about birefringent lens 112 is provided in conjunction with FIG. 3 below.

In operation, then, light produced by gain medium 102 in response to pump radiation 110 appropriately resonates along optical propagation path 114 between mirrors 106 and 108. Birefringent lens 112 is placed along optical propagation path 114 to focus and adjust the polarity of the laser light and to thereby compensate for thermo-mechanical distortions, design effects and the like. Because birefringent lens 112 is optically active in the sense of being able to affect the polarization of light while the light is being focused, the need for separate lenses and polarization compensators is suitably reduced.

Figure 2:
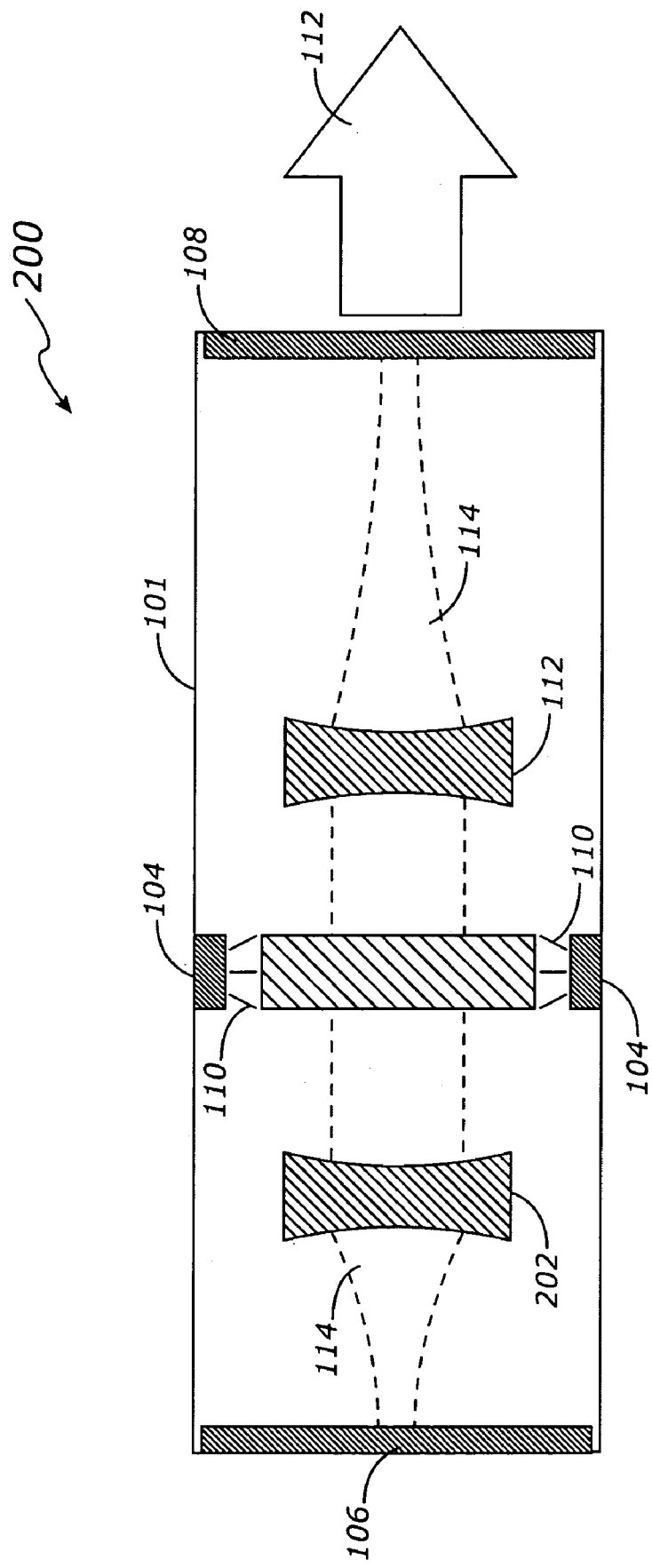
FIG. 2 is a block diagram of an exemplary alternate embodiment of a laser resonator with a second birefringent lens.

The basic concepts described above and in FIG. 1 may be modified in any number of equivalent embodiments. Lens 112 may be located on the opposite side of gain medium 102, for example, such that lens 112 is closer to back mirror 106 than to front mirror 108 instead of the arrangement shown in FIG. 1. Moreover, additional lenses may be provided within optical propagation path 114 for additional focusing and/or polarity compensation. With reference to FIG. 2, an exemplary laser resonator 200 suitably includes two lenses 112 and 202 to produce a telescoping effect upon light propagating along optical propagation path 114. Either or both of lenses 112, 202 may be formed from optically active material to affect the polarization of focused light. In an exemplary embodiment, lens 112 is formed from birefringent material to affect the polarization of light, whereas lens 202 is formed from conventional lens materials such as glass or plastic. Accordingly, the spatial layout of the various optical components within resonator chamber 101 may vary dramatically from embodiment to embodiment.

Figure 3:
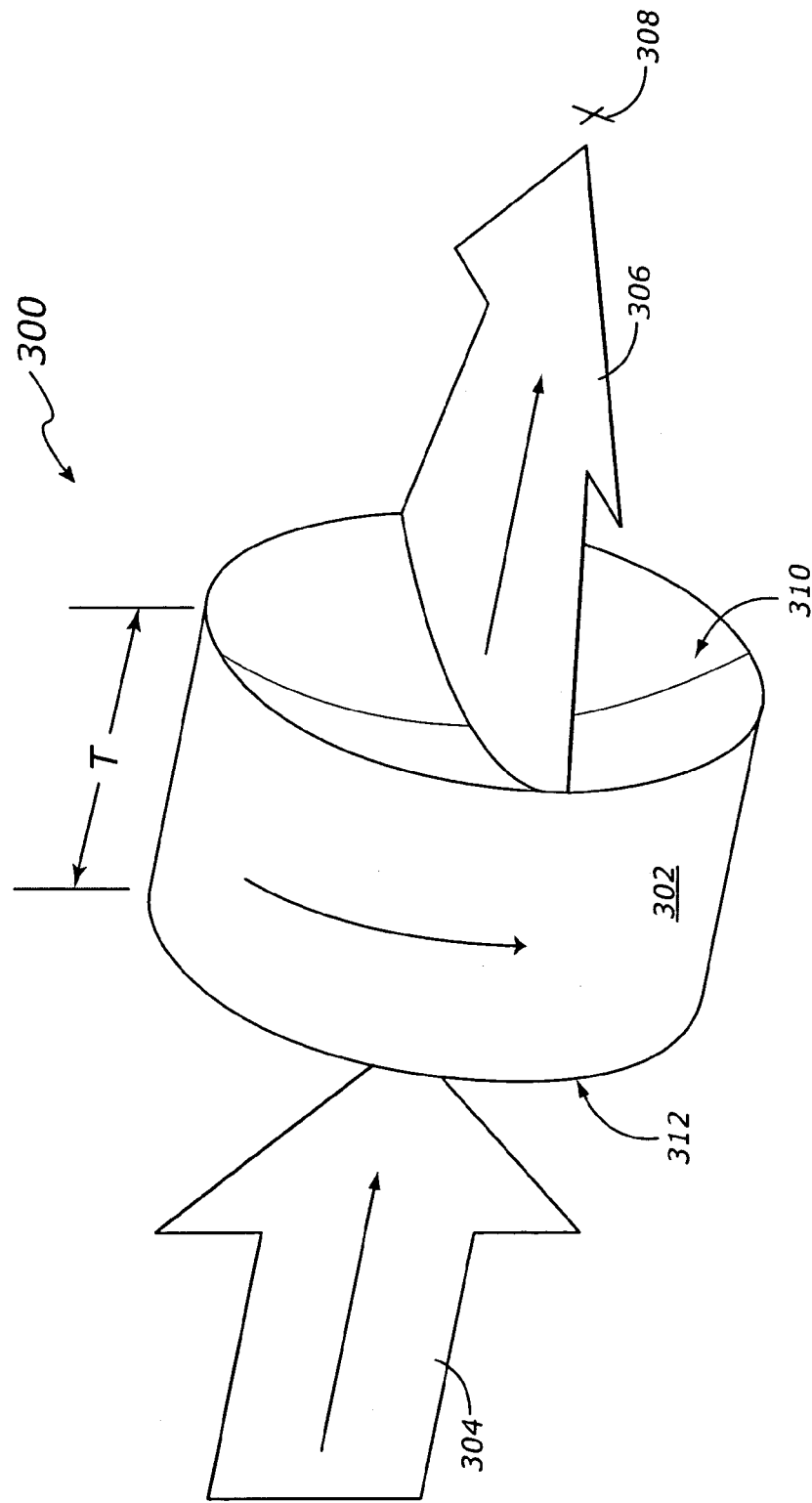
FIG. 3 is a perspective view of an exemplary birefringent lens suitable for use in a laser resonator.

With reference now to FIG. 3, an exemplary birefringent lens 300 suitably includes a body portion 302 with a front face 310 and a back face 312. As described above, body portion 302 is appropriately formed from one or more optically active materials such as calcite or quartz crystal to provide birefringence compensation for light passing through lens 300. Lens 300 is shown in FIG. 3 to be approximately cylindrical in shape, although alternate embodiments may take a generally elliptical, rectangular, conical or any other form. FIG. 3 also shows front face 310 and back face 312 as being approximately parallel to each other, although this will not be the case in all embodiments. Body 302 is formed to an appropriate thickness (T) to provide a desired amount of birefringence in lens 300, with the amount of birefringence provided being generally proportional to the thickness of the lens. In the exemplary embodiment shown in FIG. 3, the polarization of light 304 entering back face 312 is rotated by an appropriately designed phase by body 302 prior to emerging as light 306 from front face 310. Although the exact dimensions of body 302 will vary from embodiment to embodiment, body 302 will typically be large enough to encompass all the laser light cross section in the resonator and thick enough to compensate for birefringence induced phase distortions. Accordingly, in many embodiments body 302 may be on the order of several millimeters in diameter and between a fraction of a millimeter and several millimeters in thickness, although the other embodiments may incorporate lenses 300 with widely varying physical dimensions.

Body 302 may be formed using any conventional lens-making techniques, with faces 310 and 312 typically ground smooth and appropriately formed into concave or convex form to create converging or diverging lenses, respectively. Front face 310 in FIG. 3 is shown to be generally concave so as to focus emerging light 306 toward focal point 308, which could be located at any distance from lens 300 depending upon the radius of curvature of face 310. Either or both of faces 310, 312 may be formed to be concave or convex as desired for the particular embodiment; because light resonates between mirrors 106 and 108 (FIG. 1), however, lenses that are convex (i.e. converging) to light traveling in one direction (e.g. in the direction of arrows 304, 306 in FIG. 3) will appear to be concave (i.e. diverging) to light traveling in the opposite direction. Accordingly, it may be desirable to create lens surfaces that complement each other for light traveling in opposite directions through lens 300, for example by designing each face 310, 312 to be convex in shape such that divergence in one face is complemented by convergence in the opposite face, and vice versa.

Although birefringent lens 110/300 is typically described herein as being used to correct polarization errors in light passing through the lens, equivalent concepts could be used to deliberately modify the polarization of laser light or to separate laser light into two or more polarization modes propagating on optical propagation path 114. Separating laser light into distinct modes may be useful in an interferometer or other sensor based upon the Sagnac effect, for example, which senses rotation based upon phase shifts between counter-rotating beams of light, or in a wide array of other applications.

While at least one exemplary embodiment has been presented in the foregoing detailed description, it should be appreciated that a vast number of equivalent variations exist. It should also be appreciated that the exemplary embodiments described herein are only examples, and are not intended to limit the scope, applicability, or configuration of the invention in any way. Rather, the foregoing detailed description will provide those skilled in the art with a convenient road map for implementing an exemplary embodiment of the invention. Accordingly, various changes may be made in the function and arrangement of elements described in an exemplary embodiment without departing from the scope of the invention as set forth in the appended claims and their legal equivalents.

What is claimed is:

1. A laser comprising:
    a resonating chamber having a front mirror and a back mirror forming an optical propagation path;
    an optical gain medium located between the front and back mirrors within the resonating chamber, wherein the optical gain medium is configured to produce a laser light along the optical propagation path; and
    a birefringent lens located within the resonating chamber and configured to directly receive the laser light produced by the optical gain medium, wherein the birefringent lens is configured to focus and to affect the polarity of the laser light produced by the optical gain medium and passing through the birefringent lens,
    wherein the back mirror is disposed to directly receive the focused, polarized laser light output by the birefringent lens.

2. The laser of claim 1 wherein the birefringent lens is comprised essentially of an optically active material.

3. The laser of claim 2 wherein the optically active material is quartz.

4. The laser of claim 2 wherein the optically active material is calcite.

5. The laser of claim 1 wherein the birefringent lens comprises a curved exterior surface.

6. The laser of claim 1 wherein the birefringent lens is a concave lens.

7. The laser of claim 1 wherein the optical gain medium is a solid state disk.

8. The laser of claim 1 wherein the optical gain medium is a solid state rod.

9. The laser of claim 1 wherein the optical gain medium is a solid state slab.

10. The laser of claim 1 wherein a portion of the optical propagation path between the birefringent lens and the back mirror is free of a polarization element.

11. The laser of claim 1 wherein the birefringent lens is formed from of a single piece of birefringent lens material.

12. A laser resonator for producing a laser beam, the resonator comprising:
    a chamber having a front mirror and a back mirror defining an optical propagation path;
    an optical gain medium located between the front and back mirrors within the chamber, wherein the optical gain medium is configured to produce a laser light along the optical propagation path in response to pump radiation; and
    a birefringent lens located within the resonating chamber and configured to directly receive the laser light produced by the optical gain medium, wherein the birefringent lens is formed of an optically active material and comprises a substantially curved exterior surface to focus the laser light while adjusting the polarity of the laser light produced by the optical gain medium and passing through the birefringent lens, thereby forming the laser beams,
    wherein the back mirror is disposed to directly receive the laser beam output by the birefringent lens.

13. The laser resonator of claim 12, wherein the optically active material comprises calcite.

14. The laser resonator of claim 12, wherein the optically active material comprises quartz.

15. The laser resonator of claim 12, wherein the substantially curved exterior surface is concave such that the birefringent lens is a converging lens.

16. The laser resonator of claim 12, wherein the substantially curved exterior surface is convex such that the birefringent lens is a diverging lens.

17. The laser resonator of claim 12 wherein a portion of the optical propagation path between the birefringent lens and the back mirror is free of a polarization element.

18. The laser resonator of claim 12 wherein the birefringent lens is formed from of a single piece of birefringent lens material.

19. A laser for producing a laser beam, the laser comprising:
    a first mirror having a first reflective surface;
    a second mirror having a second reflective surface;
    a gain medium disposed between the first and second reflective surfaces adjacent the first mirror and configured to produce laser light therebetween; and
    an integrated birefringent lens displaced between the gain medium and the second mirror and configured to directly receive the laser light produced by the gain medium, wherein the integrated birefringent lens comprises an optically active material and a curved surface to thereby simultaneously affect both the polarization and focus of light produced by the gain medium and passing therethrough;
    wherein the second mirror is disposed to directly receive the focused, polarized laser light output by the integrated birefringent lens.

20. The laser of claim 19 further comprising a second lens displaced between the first mirror and the gain medium.

21. The laser of claim 20 wherein the second lens is a birefringent lens.

22. The laser of claim 20 wherein the optically active material comprises quartz.

23. The laser of claim 20 wherein the optically active material comprises calcite.

24. The laser of claim 19 wherein a path between the integrated birefringent lens and the second mirror is free of a polarization element.

25. The laser of claim 19 wherein the integrated birefringent lens is formed from of a single piece of birefringent lens material.

* * * * *